(12) United States Patent
Guiassa et al.

(10) Patent No.: US 11,230,393 B1
(45) Date of Patent: Jan. 25, 2022

(54) METHODS FOR MEASURING PART SIZE AND RUNOUT

(71) Applicant: PRATT & WHITNEY CANADA CORP., Longueuil (CA)

(72) Inventors: Rachid Guiassa, Montreal (CA); Lafleche Gagnon, Sainte-Julie (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 16/936,521

(22) Filed: Jul. 23, 2020

(51) Int. Cl.
  *B64F 5/60* (2017.01)
  *G01M 15/14* (2006.01)

(52) U.S. Cl.
  CPC ............... *B64F 5/60* (2017.01); *G01M 15/14* (2013.01)

(58) Field of Classification Search
  CPC .................................. G01M 15/14; B64F 5/60
  See application file for complete search history.

(56) References Cited

U.S. PATENT DOCUMENTS

| | | | |
|---|---|---|---|
| 5,257,460 A | 11/1993 | McMurtry | |
| 5,313,410 A | 5/1994 | Watts | |
| 6,233,533 B1 | 5/2001 | Xu et al. | |
| 7,036,236 B1 | 5/2006 | Drescher et al. | |
| 7,712,224 B2 | 5/2010 | Hicks | |
| 8,219,353 B2 | 7/2012 | Lee et al. | |
| 8,831,899 B2* | 9/2014 | Nemoto | G01N 21/9501 702/104 |
| 9,151,602 B2 | 10/2015 | Noda et al. | |
| 9,335,143 B2 | 5/2016 | Noda et al. | |
| 10,648,791 B2 | 5/2020 | Lamendola | |
| 10,852,709 B2 | 12/2020 | Blais et al. | |
| 2005/0143956 A1 | 6/2005 | Long et al. | |
| 2009/0025463 A1* | 1/2009 | McFarland | G01B 21/045 73/104 |
| 2014/0047716 A1* | 2/2014 | Cabral | B23P 15/003 29/898 |
| 2014/0223751 A1* | 8/2014 | Alxneit | G01B 5/004 33/503 |
| 2014/0228996 A1* | 8/2014 | Owens | G05B 19/401 700/114 |
| 2016/0040987 A1* | 2/2016 | Bernhardt | G01B 21/04 33/503 |
| 2017/0314910 A1* | 11/2017 | Ikebuchi | G06T 7/60 |
| 2017/0314911 A1* | 11/2017 | Futami | G06T 7/60 |
| 2018/0364677 A1* | 12/2018 | Jalluri | G01K 1/026 |
| 2019/0323834 A1* | 10/2019 | Sakai | G01B 5/201 |
| 2021/0132590 A1* | 5/2021 | Kojima | G05B 19/4155 |

* cited by examiner

*Primary Examiner* — Eric S. McCall
(74) *Attorney, Agent, or Firm* — Norton Rose Fulbright Canada LLP

(57) ABSTRACT

A part measuring kit for a rotary table on a machine bed includes a part fixture mountable on the rotary table for retaining a part to be measured and/or an object having known dimensions. The kit further includes a measuring device mountable on the machine bed and movable relative to the rotary table for taking measurements of the part to be measured and/or the object having known dimensions, wherein the rotary table is rotatable between each taken measurement. The kit further includes a calibration offset calculator for calculating a calibration offset for the measuring device by comparing taken measurements of the object having known dimensions with the known dimensions, and correcting taken measurements of the part to be measured via the calculated calibration offset.

18 Claims, 10 Drawing Sheets

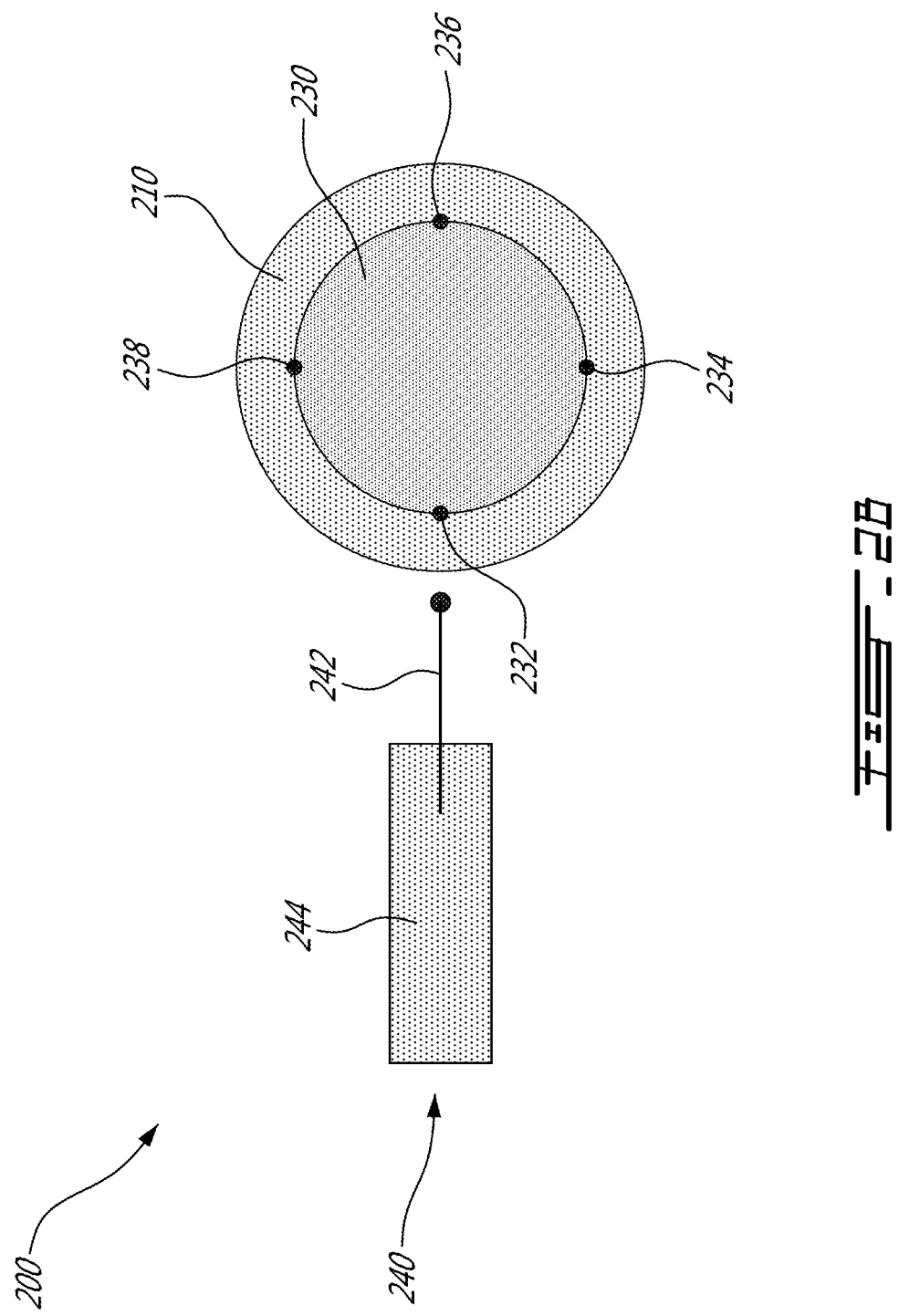

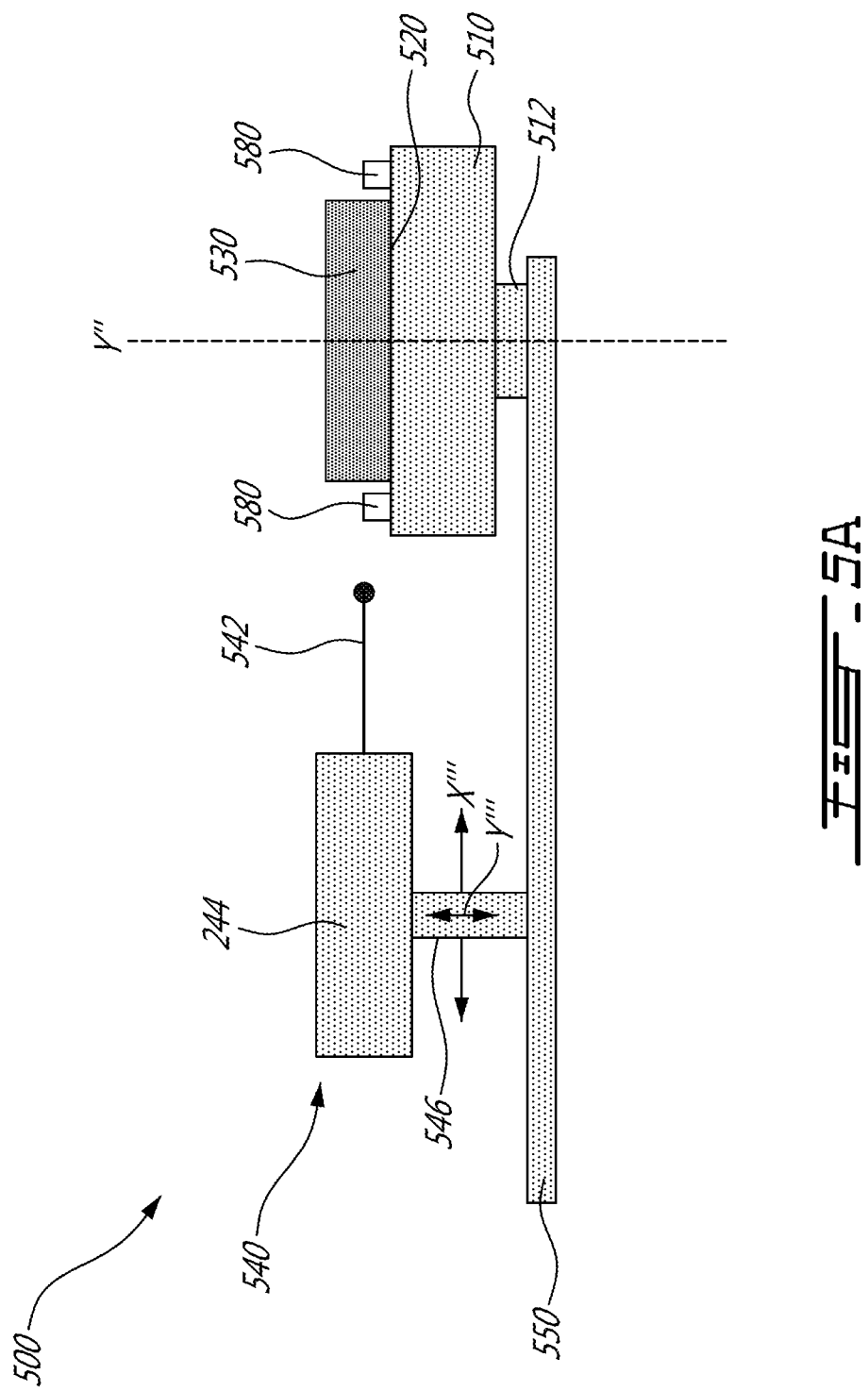

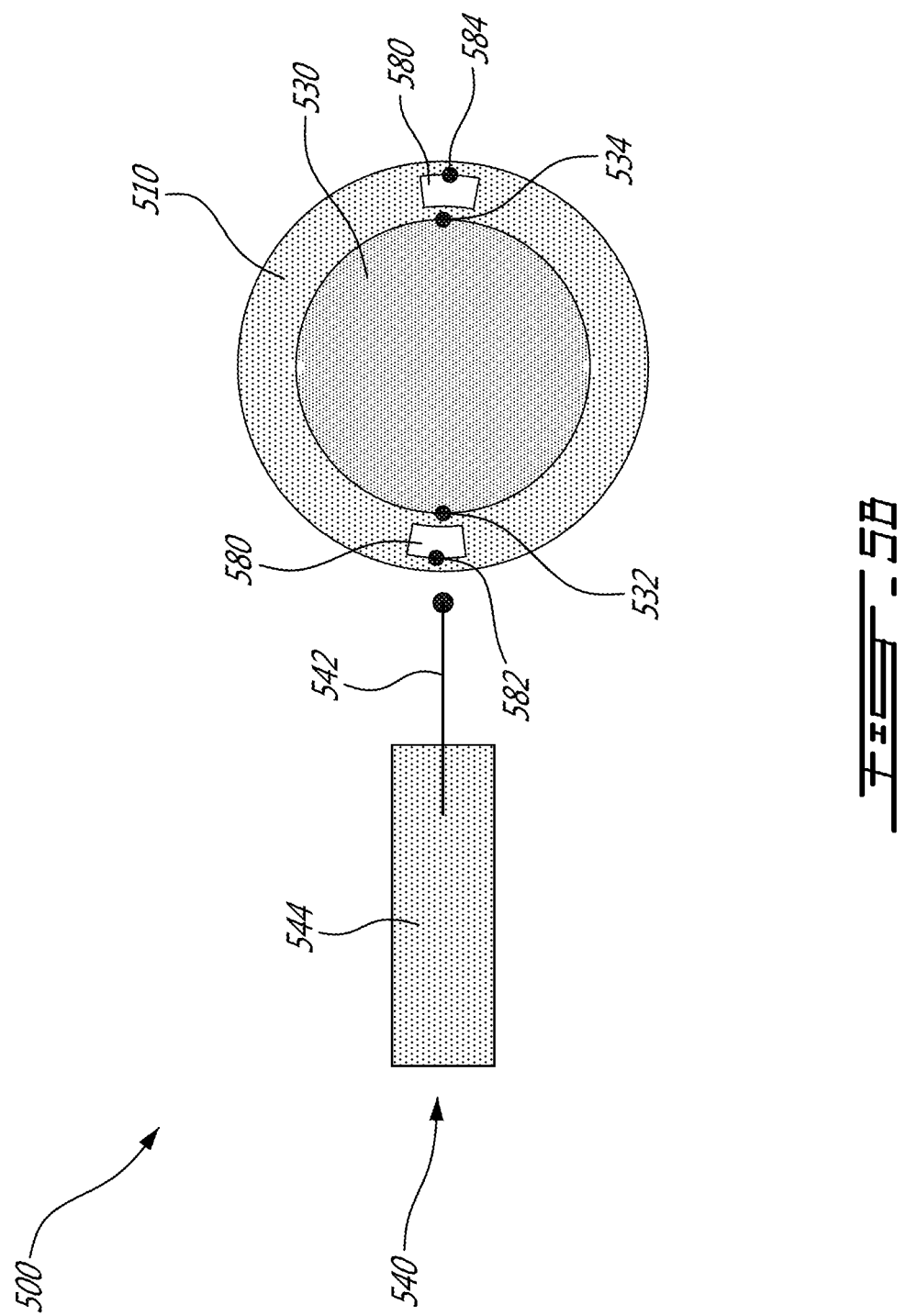

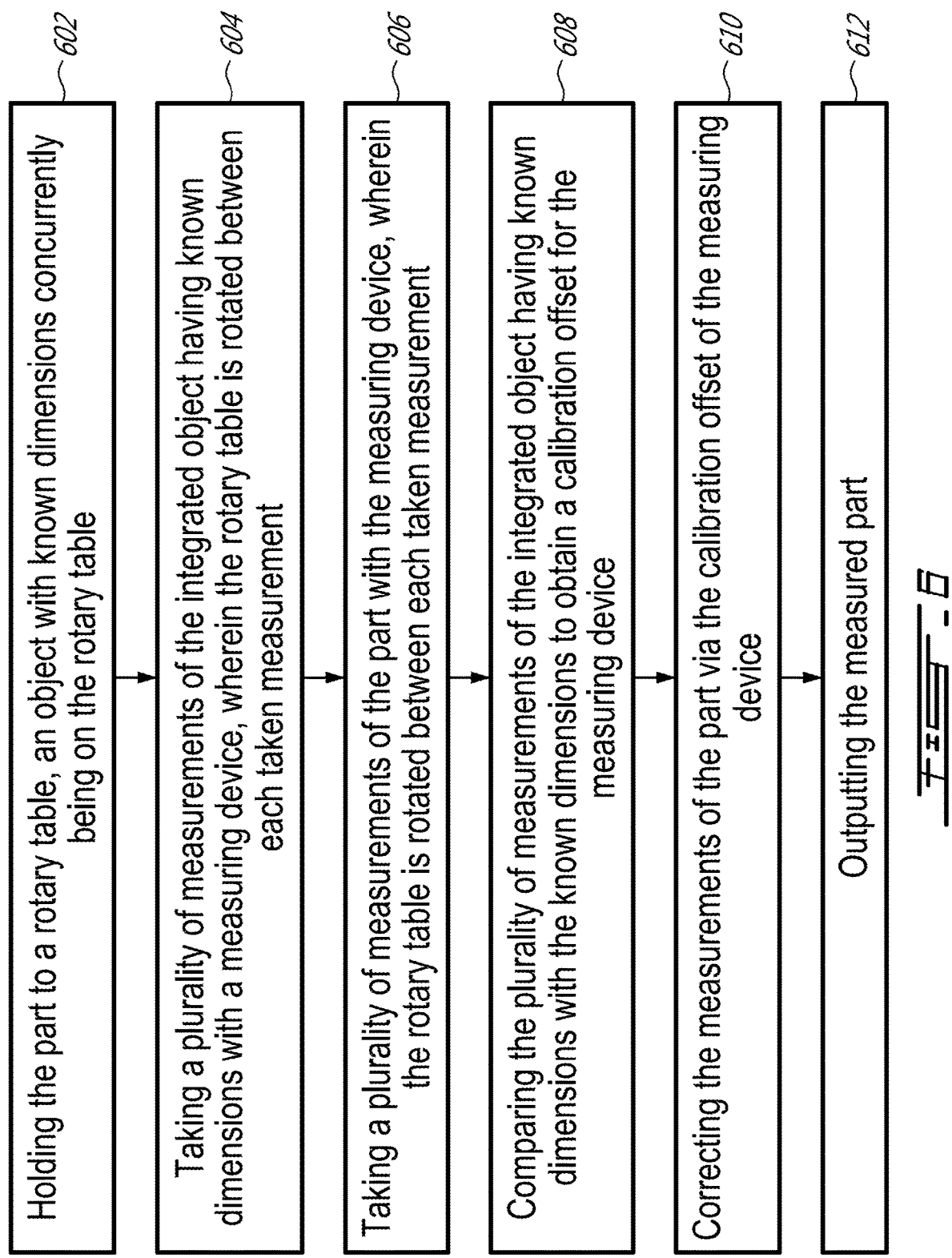

METHODS FOR MEASURING PART SIZE AND RUNOUT

TECHNICAL FIELD

The application relates generally to part measurements and, more particularly, to systems and methods for measuring part size and runout.

BACKGROUND OF THE ART

Parts are inspected to ensure that they meet various requirements related to, for example, dimensions, tolerances and performance. Precision and repeatability are essential to ensure that part inspection processes are reliable and accurate.

It is often required to inspect parts directly on a machining bed, for example a rotary lathe. Various factors may affect the accuracy and repeatability of the measurements to be taken, such as mechanical structures, thermal behaviors, environmental considerations, etc. For instance, non-controlled environments present numerous challenges for the repeatability of measurement taking, for example when temperatures and other environmental conditions fluctuate. Measuring devices thus must typically be calibrated before measurements of the part to be inspected are taken. However, the above-mentioned factors may require the measuring device to be calibrated multiple times in a given inspection period due to these fluctuating conditions.

SUMMARY

In one aspect, there is provided a system for outputting a part of an aircraft, comprising a rotary table rotatable about a rotation axis and having a part fixture operable to removably secure an object having known dimensions to the rotary table, the part fixture operable to removably secure the part to the rotary table when the object is removed from the part fixture, an actuator operatively connected to the rotary table and operable to rotate the rotary table about the rotation axis, a processing unit operatively connected to the actuator and to a measuring device, the measuring device operable to execute measurements of the object while the object is removably secured to the part fixture, and of the part while the part is removably secured to the part fixture, and a non-transitory computer-readable memory communicatively coupled to the processing unit and comprising computer-readable instructions executable by the processing unit, the instructions, when executed by the processing unit, causing, while the object is removably secured to the part fixture, calibrating the measuring device by receiving, by the processing unit, a plurality of measurements of the object from the measuring device, rotating, by the processing unit, via the actuator the rotary table between each measurement of the plurality of measurements of the object, and determining, by the processing unit, a calibration offset of the measuring device by determining differences between the plurality of measurements and the known dimensions of the object, while the part is removably secured to the part fixture, receiving, by the processing unit, a plurality of measurements of the part from the measuring device, and rotating, by the processing unit, via the actuator the rotary table between each measurement of the plurality of measurements of the part, correcting, by the processing unit, the plurality of measurements of the part based on the calibration offset of the measuring device, and generating, by the processing unit, at least one signal indicative of outputting the measured part.

In another aspect, there is provided a part measuring kit for a rotary table on a machine bed, comprising a part fixture mountable on the rotary table for retaining a part to be measured and/or an object having known dimensions, a measuring device mountable on the machine bed and movable relative to the rotary table for taking measurements of the part to be measured and/or the object having known dimensions, wherein the rotary table is rotatable between each taken measurement, and a calibration offset calculator for calculating a calibration offset for the measuring device by comparing taken measurements of the object having known dimensions with the known dimensions, and correcting taken measurements of the part to be measured via the calculated calibration offset.

In a further aspect, there is provided a method for outputting a part, comprising holding the part to a rotary table, an object having known dimensions concurrently being on the rotary table, taking a plurality of measurements of the integrated object having known dimensions with a measuring device, wherein the rotary table is rotated between each taken measurement, taking a plurality of measurements of the part with the measuring device, wherein the rotary table is rotated between each taken measurement, comparing the plurality of measurements of the integrated object having known dimensions with the known dimensions to obtain a calibration offset for the measuring device, correcting the measurements of the part via the calibration offset of the measuring device, and outputting the measured part.

Further in accordance with the third aspect, for instance, taking a plurality of measurements of the integrated object having known dimensions further includes rotating the rotary table by 180 degrees between each taken measurement.

Further in accordance with the third aspect, for instance, taking a plurality of measurements of the part further includes rotating the rotary table by 180 degrees between each taken measurement.

Further in accordance with the third aspect, for instance, taking a plurality of measurements of the part includes measuring a diameter of the part.

Further in accordance with the third aspect, for instance, taking a plurality of measurements of the part includes measuring a distance between two parallel surfaces on the part.

Further in accordance with the third aspect, for instance, the method further comprises taking sets of sequential measurements of the integrated object having known dimensions and the part, wherein the rotary table is rotated between each set of sequentially taken measurements.

Further in accordance with the third aspect, for instance, the method further comprises selecting the object having known dimensions to have a lesser height than the part to be measured.

Further in accordance with the third aspect, for instance, taking a plurality of measurements of the part includes probing the part.

DESCRIPTION OF THE DRAWINGS

Reference is now made to the accompanying figures in which:

FIGS. 2A-2C are a schematic side view, a schematic top view and a block diagram of a part measuring system, according to an embodiment of the present disclosure;

FIGS. 5A-5B are respective side and top schematic views of a part measuring system, according to an additional embodiment of the present disclosure; and FIG. 6 is flowchart of an exemplary method for measuring a component with the part measuring system shown in FIGS. 5A-5B.

DETAILED DESCRIPTION

Herein described are methods and systems for measuring a component or part via a measuring instrument or device including, in some embodiments, a measuring probe translatable along one or more axes. Other measuring instruments may be considered, such as optical instruments, which make use of laser-based scanners, infra-red scanners, and/or other scanning devices, to produce measurements regarding properties of the component.

The present disclosure provides systems and methods for measuring a component using measurements acquired via a measuring instrument that is calibrated by taking additional measurements of an object having known dimensions, referred to as an artifact, and comparing these taken measurements to the artifact's known measurements. Such systems may be, in various embodiments, automated or semi-automated. In an embodiment, the herein described systems may be provided as a kit to be installed on a machine bed or other surface in order to measure a component or part. In some embodiments, the machine is calibrated with the artifact before the component is measured, while in other embodiments the calibration and measurement steps occur simultaneously. Various parts can be measured by the herein described systems and methods, having surfaces with varying shapes. For example, the herein described methods and systems can be used to measure the diameter of a circular surface, the distance between two parallel surfaces, etc.

Figure 1:
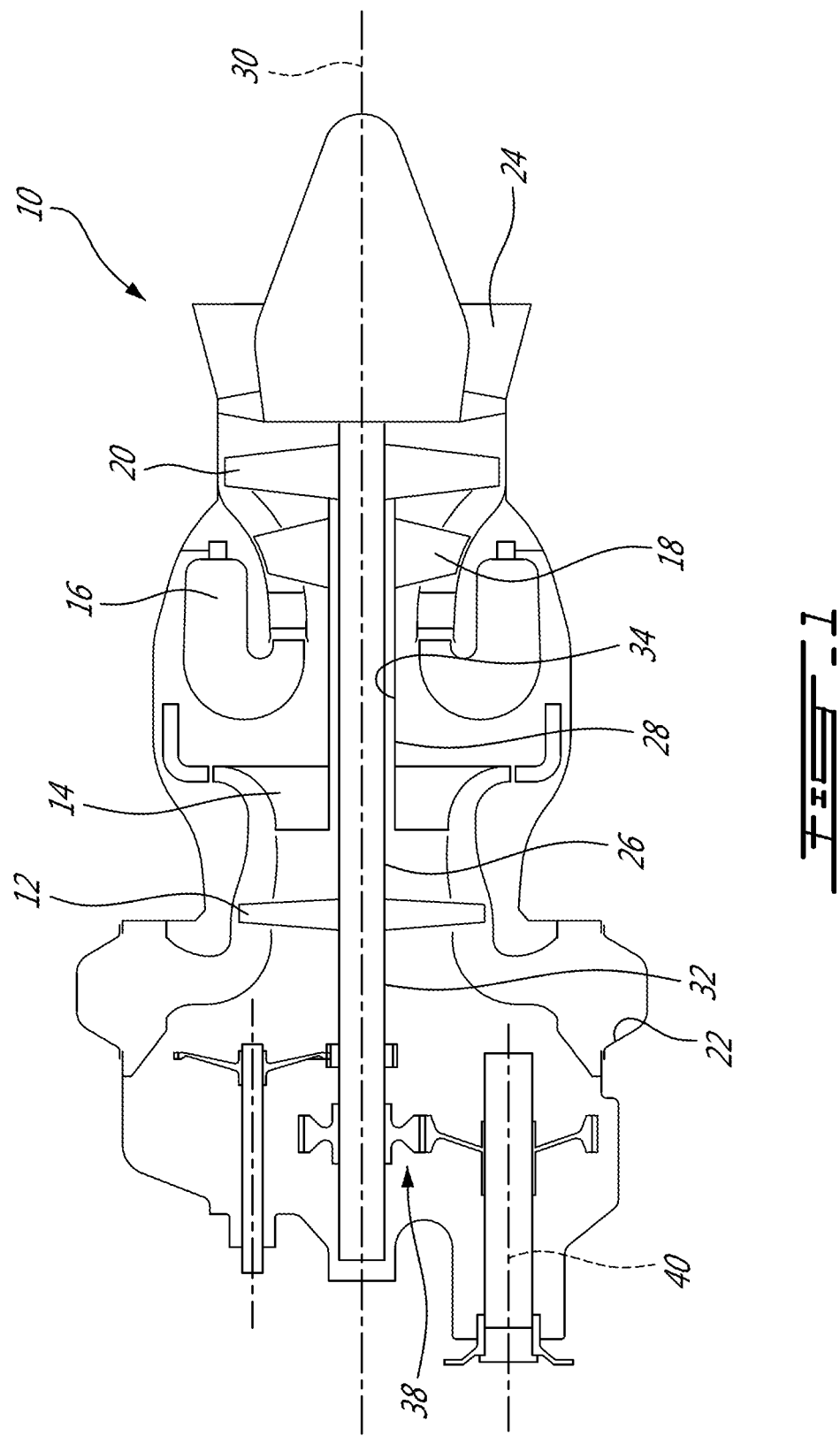
FIG. 1 is a cross-sectional view of an example turboshaft engine of an aircraft.

For context, and with reference to FIG. 1, a gas turbine engine 10 is shown. In this example, the engine 10 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 10 has multiple, i.e. two or more, spools which may perform the compression to pressurize the air received through an air inlet 22, and which extract energy from the combustion gases before they exit via an exhaust outlet 24. In the illustrated embodiment, the engine 10 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 10 may include a transmission 38 driven by the low pressure shaft 32 and driving a rotatable output shaft 40. The transmission 38 may vary a ratio between rotational speeds of the low pressure shaft 32 and the output shaft 40.

The gas turbine engine 10 is composed of a plurality of different components, each of which can be required to conform to one or more standards. In some embodiments, the standards are established by the manufacturer of the components, or of the gas turbine engine 10. In some other embodiments, the standards are established by a regulatory agency, for instance in accordance with safety requirements or the like. The standards can dictate values for one or more properties of the components, including length, width, height, thickness, gap, planarity and/or waviness, angle (absolute and/or relative), curvature (including regarding radius, diameter, circumference, arc length, etc.), and the like.

Although the present disclosure discusses techniques for obtaining measurements, including systems and methods for measuring a component, in the context of components for an engine, for instance the gas turbine engine 10, it should be noted that the techniques described herein are applicable in other contexts.

Figure 2A:
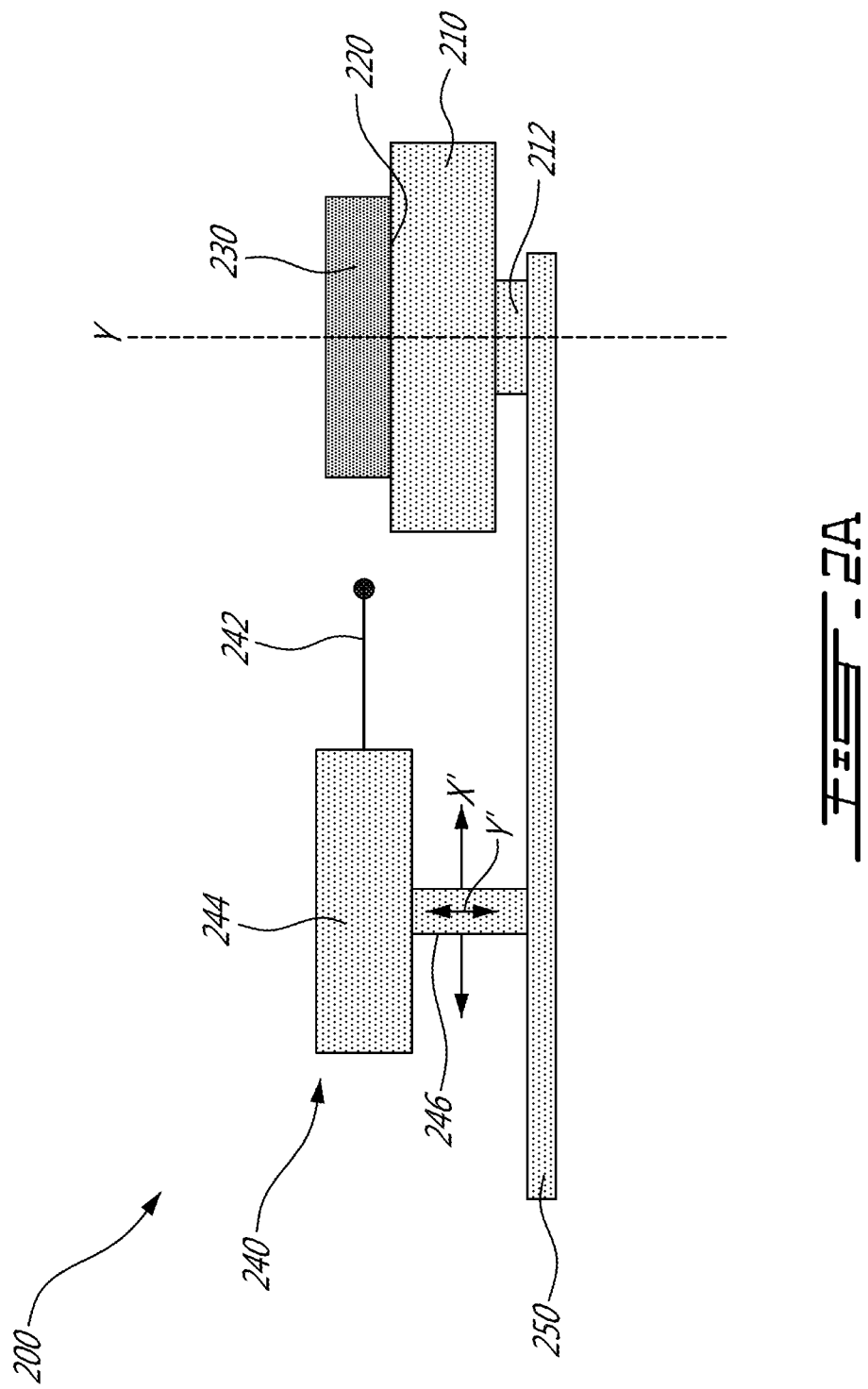

With reference to FIGS. 2A and 2B, there is shown a part measuring system 200, in accordance to an embodiment of the present disclosure. The system includes a rotary table 210 having a part fixture 220 mountable thereto. In various embodiments, the part fixture 220 may be removably or permanently coupled to the rotary table 210. In other embodiments, the rotary table 210 may be provided with an integrated part fixture 220. The rotary table 210 is rotatable about a vertical axis Y passing through a center point of the rotary table 210, and the rotation of the rotary table 210 is imparted to the part fixture 220. In the present embodiment, an actuator 212 is operatively connected to the rotary table 210 to rotate the rotary table 210 as described herein. The actuator 212 may be any suitable device or system, such as but not limited to an electric motor (not shown), a pneumatic motor, and the like. The actuator 212 may be operatively connected to the rotary table 210 in any way suitable to each particular embodiment of the system 200 and the part(s) to be processed/outputted by the system 200. For example, the actuator 212 may be operatively connected to the rotary table 210 through one or more gears, belts or other such components (not shown). Other rotational driving arrangements may be considered as well. The part fixture 220 may be any suitable device or system so long as it is operable to retain a component or part 230 to be measured and imparting the rotation from the rotary table 210 to the retained part 230. The part fixture 220 may for example be a chuck, a clamp, etc. As discussed above, the part 230 to be measured may be a component of a gas turbine engine as in FIG. 1, or another type of component. As will be discussed in further detail below, an object having known dimensions (not shown), also referred to as an artifact, may be retained by the part fixture 220 for calibration purposes. A measuring instrument or device 240 is provided to take measurements of the part 230. As will be discussed in further detail below, in various embodiments, the measuring device 240 may be calibrated by taking measurements of the artifact and by comparing these taken measurements to the artifact's known dimensions.

In an embodiment, the rotary table 210 and the measuring device 240 are mountable to a machine table 250, for instance to allow a part 230 to be measured immediately after its production or modification. Such machine tables 250 may include a lathe, a milling machine, a computer numerical control (CNC) machine, an additive printing machine, etc. In other embodiments, the rotary table 210 and the measuring device 240 may be mounted to other tables or surfaces to measure the part 230.

Illustratively, the measuring device 240 includes a probe 242 for contacting surfaces on the part 230 to be measured and recording their relative positions. The measuring device 240 may further include a housing 244 and a base 246 for joining the measuring device 240 to the machine table 250 or to another surface. In the embodiment shown in FIG. 2A, the measuring device 240 is movable along horizontal axis X' and vertical axis Y', allowing the probe 242 to approach the part 230 to be measured and take various measurements. The movements may be two translational degrees of freedom (DOF), though rotational DOFs may be possible as well. In embodiments, the housing 244 may include linear actuator(s), cylinder(s), electric motor(s) and various belts, gears and the like to allow the measuring device to move along axes X' and Y'. Other measurement devices 240 may be considered, such as optical devices employing infrared technology, laser technology or the like. In such cases, the measuring device 240 may be solely movable along the vertical axis Y' as it may record its measurements without having to approach the part 230 along the X' axis. In various embodiments, the rotary table 210 may rotate by a predetermined increment, for example by 90 degrees, between each taken measurement by the measuring device 240. Such a process may be automated or semi-automated, as will be discussed in further detail below.

Figure 2C:
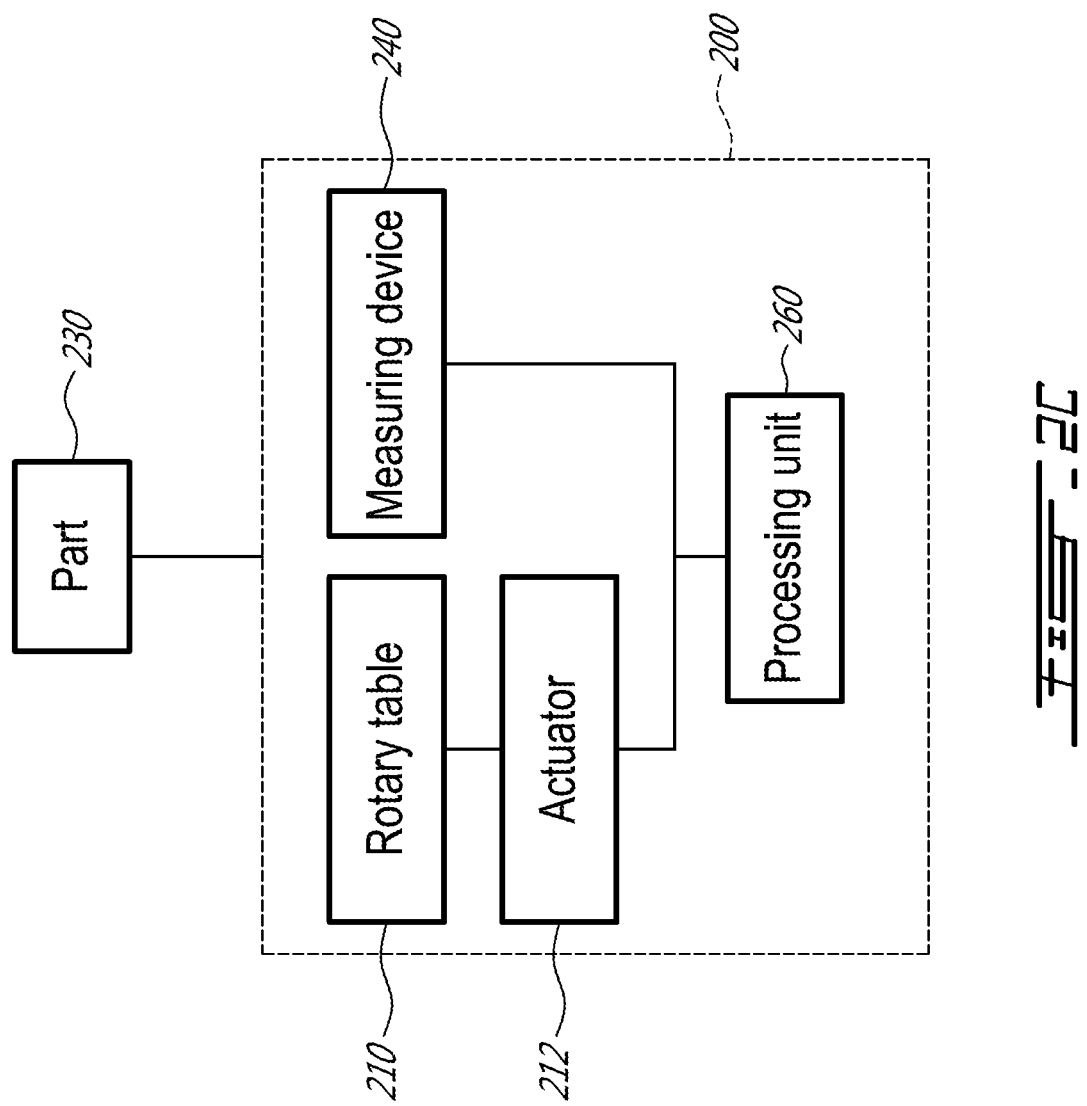

Referring additionally to FIG. 2C, an embodiment of system 200 is shown in schematic form. While the part fixture 220 is omitted from FIG. 2C, it is understood that the part 230 being measured is fixed to the part fixture 220 which is mounted to rotary table 210, as discussed above. The system 200 may further include a processing unit 260 which is operatively connected to the actuator 212 and the measuring device 240. The processing unit 260 may include one or more processor and any suitable known or other machine-readable storage medium. The non-transitory computer readable storage medium may be, for example, but is not limited to, an electronic, magnetic, optical, electromagnetic, infrared, or semiconductor system, apparatus, or device, or any suitable combination of the foregoing. The processing unit 260 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. As will be discussed in further detail below, the non-transitory computer readable storage medium may be coupled to the processing unit 260 and include various computer readable instructions executable by the processing unit 260. The processing unit 260 may be operable to instruct the measuring device 240 to move along the X' and Y' axes to take measurements of the part 230 or of the artifact for calibration purposes. The processing unit 260 may additionally record the taken measurements of the part 230 and perform various corrections of these measurements based on a calibration offset calculated from measurements taken of the artifact, as will be discussed in further detail below. The processing unit 260 may additionally instruct the rotary table 210 to rotate by a predetermined value in between each taken measurement by the measuring device 240.

A part measuring kit for a rotary table 210 on a machine table 250 or machine bed may be provided. Such a kit may include, for instance, a part fixture 220, a measuring device 240, and a calibration offset calculator (not shown), which may be integrated into the processing unit 260 to calculate or determine a calibration offset for the measuring device 240, as will be discussed in further detail below. One or more objects having known dimensions, also referred to as artifacts (as discussed above), may also be part of the kit.

Figure 3:
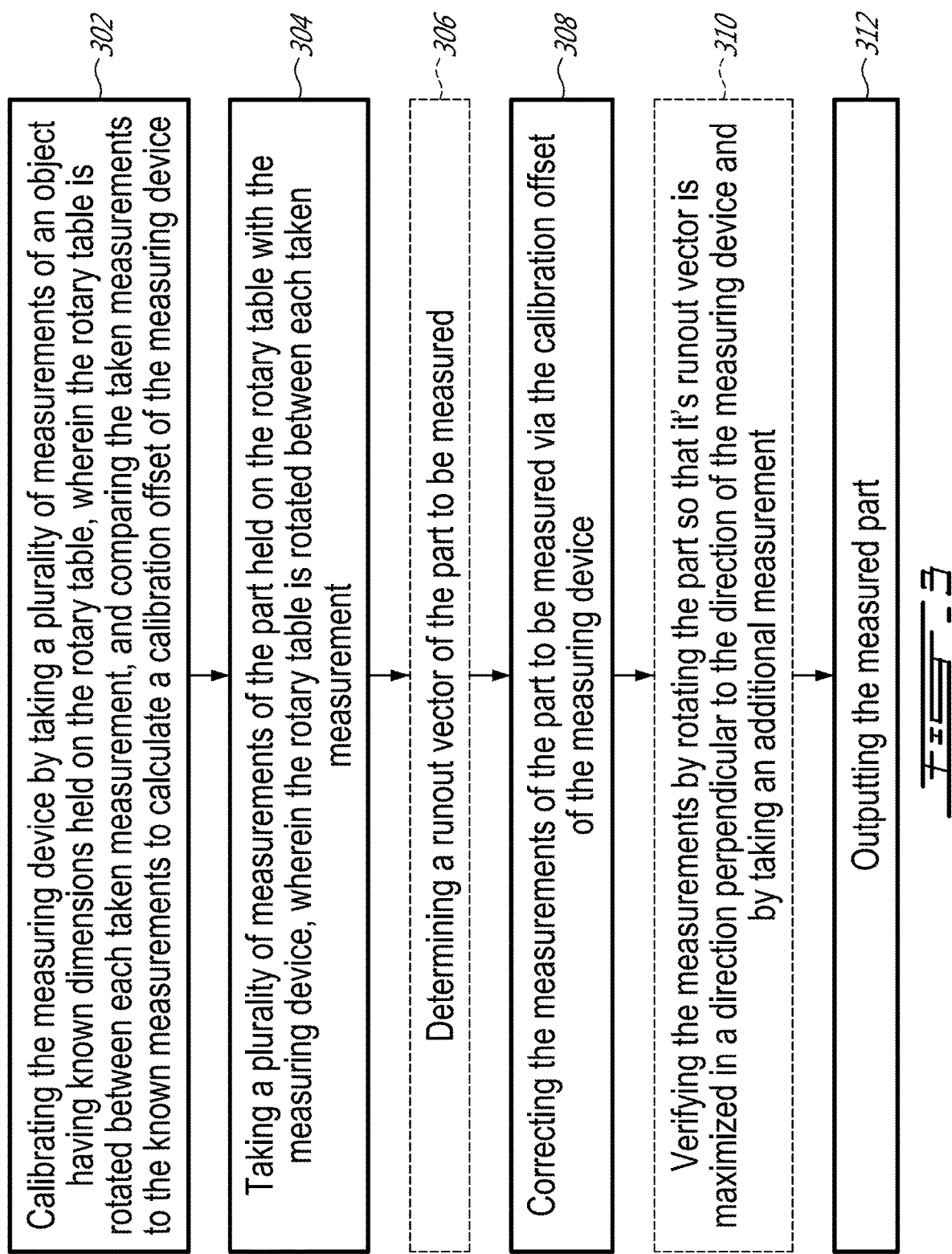
FIG. 3 is a flowchart of an exemplary method for measuring a component with the part measuring system shown in FIGS. 2A-2C.

With reference to FIG. 3 in addition to FIGS. 2A-2C, there is shown a method 300 for measuring and outputting a part, for instance the part 230, in accordance with an embodiment of the present disclosure. The method 300 may be of the type performed by the system 200, for instance in an automated or semi-automated mode using the processing unit 260 operating the rotary table 210 and the measuring device 240. At step 302, the measuring device 240 is calibrated by taking a plurality of measurements of the artifact (not shown) whose dimensions are known. The artifact may be placed, held or fixed to the part fixture 220 in order to take its measurements. The measurement device 240 is displaced along the X' and Y' axes to ensure proper alignment with the artifact. The probe 242 is thus able to contact various points on the artifact to record their positions, for instance with reference to the X' axis. After each taken measurement of the artifact, the rotary table 210 is rotated by a predetermined value. In an embodiment, the rotary table 210 is rotated by 90 degrees between each taken measurement so that four measurements of the artifact are taken. Other rotation amounts may be considered as well. Once the measurements of the artifact are taken, they are compared to the artifact's known dimensions to calculate a calibration offset of the measuring device 240. As the artifact's true dimensions are known, any discrepancies between the taken measurements and the known dimensions are likely caused by the measuring device 240 being uncalibrated to the specific environment at the specific time in which the method 300 is being practiced. As such, the calculated calibration offset can be stored, for example by the processing unit, to correct subsequent measurement taking of the part 230.

At step 304, a plurality of measurements of the part 230 are taken with the measuring device 240. As was the case in step 302, the part 230 is held on the rotary table 210 and the measurement device 240 is displaced along the X' and Y' axes to ensure proper alignment with the part 230 and to allow the probe 242 to contact various contact points 232-238 on the part 230 to record their positions, for instance with reference to the X' axis, or in a X, Y coordinate system relative to axes X' and Y or Y'. Similarly, after each measurement of the part 230 is taken, the rotary table 210 is rotated by a predetermined value. In an embodiment, the rotary table 210 is rotated by 90 degrees between each taken measurement so that four measurements of the part 230 are taken, illustratively at four contact points 232-238.

At optional step 306, as will be discussed in further detail below, a runout vector of the part 230, including a runout size and a runout orientation, may be calculated to further improve the accuracy of the measurement method 300.

At step 308, the taken measurements of the part 230 are corrected via the calibration offset of the measuring device 240 that was calculated at step 302. As discussed above, the calibration offset is calculated by comparing the taken measurements of the artifact with its known dimensions to account for the environment in which the method 300 is practiced. As such, the accuracy and repeatability of the taken measurements of the part is improved. In an embodiment, the calibration of the measuring device 240 is repeated one or more times to ensure accurate results and to account for varying environmental conditions such as temperature fluctuations.

Figure 4A:
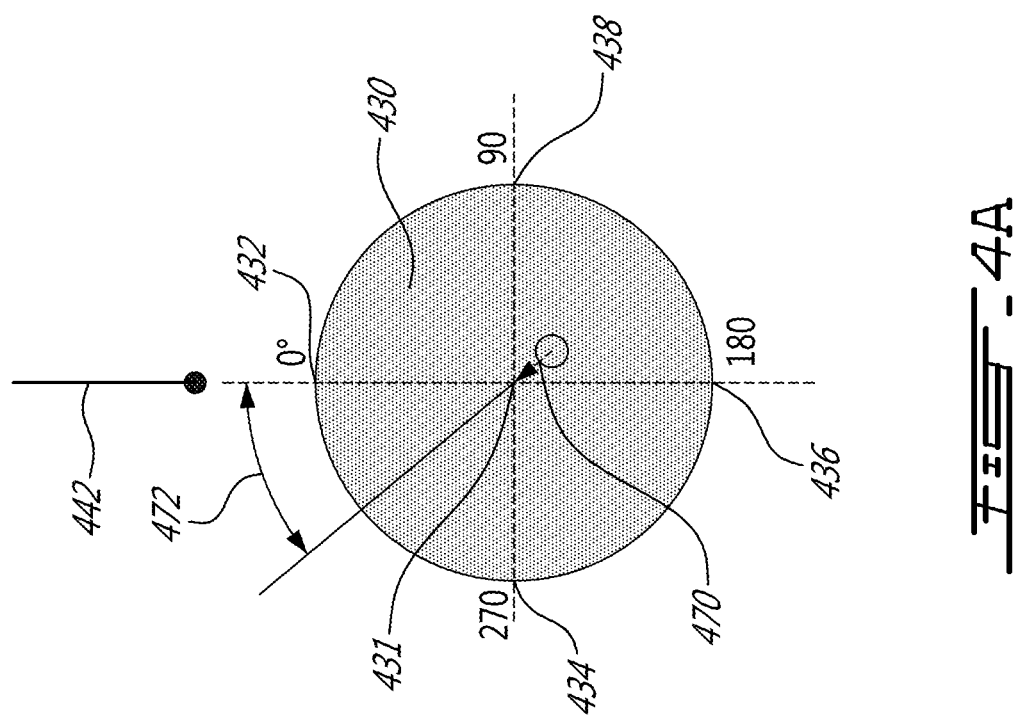
FIG. 4A-4B are additional top schematic views of the part measuring system shown in FIGS. 2A-2C.
Figure 4B:
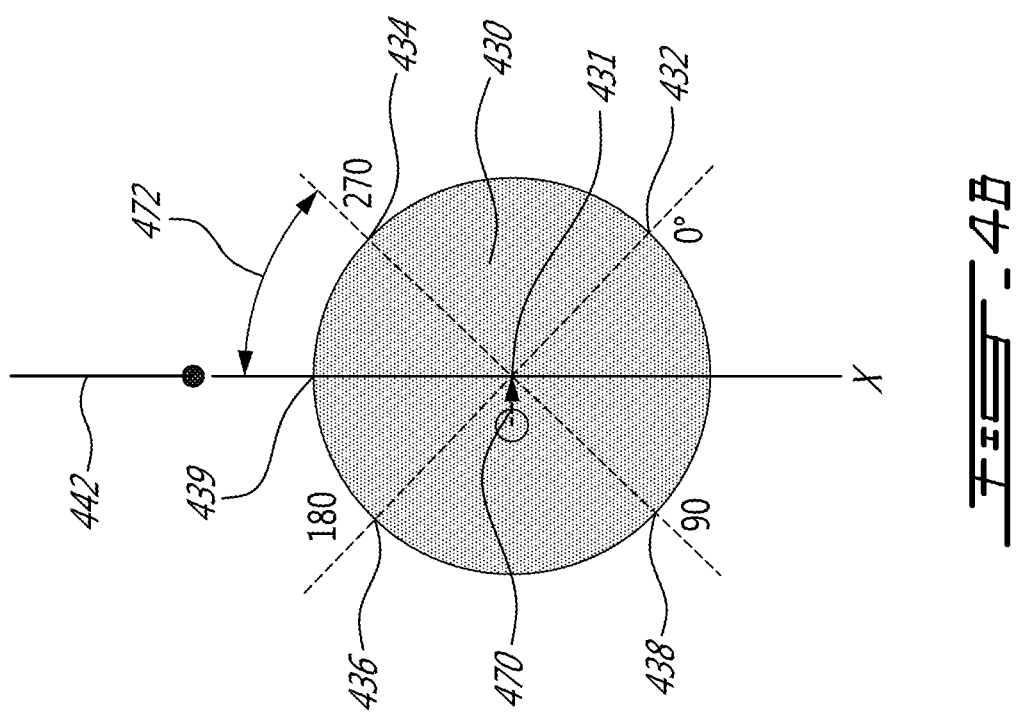

Parts to be measured often have non-standard shapes and sizes, and even standard shapes, for example circles, and may have irregularities such as runouts or runoffs that should be accounted for when being measured. For instance, such runouts may impact the diameter measurement of a circular feature, and thus should be taken into consideration. As such, with additional reference to FIGS. 4A and 4B, at optional step 306 a runout vector 470 of the part to be measured, illustratively part 430, is determined. Such determination occurs after the probe 442 records measurements at distinct contact points on the part 430, illustratively four contact points 432-438. Runout vector 470 has a magnitude representing the overall extent of the runout of part 430, and an overall direction shown in angular form by reference numeral 472. As shown in FIGS. 4A-4B, runout vector 470 is virtualized to terminate at a center point 431 of the part 430. As such, at optional step 310, the taken and corrected measurements from steps 304-308 may be verified by rotating the part 430 so that its runout vector 470 is maximized in a direction perpendicular to the direction of the measurement device, illustratively axis X extending from the probe 442 through center point 431. Once rotated as such, an additional measurement is taken, illustratively at additional contact point 439. This additional verification measurement may be corrected via the calibration offset from step 302 to ensure maximum accuracy.

At step 312, the measured part 230 (or 430) is outputted with calibrated measurements. In an embodiment, method 300 is performed as part of a larger part inspection system whereby the desired or expected measurements of part 230 (or 430) are known. As such, the calculated and calibrated measurements of outputted part 230 (or 430) may be compared to these expected measurements to verify if the part 230 (or 430) meets certain criteria, for example if its measurements fall within an acceptable tolerance range.

Method 300 may be implemented, for instance, by the processing unit 260, causing the following actions to occur. While the object having known dimensions (i.e. the artifact) is removably secured to the part fixture 220, the measuring device is calibrated by receiving, by the processing unit 260, a plurality of measurements of the object from the measuring device 240, rotating, by the processing unit 260, via the actuator 212 the rotary table 210 between each measurement of the plurality of measurements of the object, and determining, by the processing unit 260, a calibration offset of the measuring device 240 by determining differences between the plurality of measurements and the known dimensions of the object. Then, while the part 230 is removably secured to the part fixture 220 the part 230 is measured by receiving, by the processing unit 260, a plurality of measurements of the part 230 from the measuring device 210, and rotating, by the processing unit 260, via the actuator 212 the rotary table 210 between each measurement of the plurality of measurements of the part 230. The processing unit then corrects the plurality of measurements of the part 230 based on the calibration offset of the measuring device 240. Then, the processing unit may generate one or more signals indicative of outputting the measured part.

With reference now to FIGS. 5A and 5B, there is shown a part measuring system 500, in accordance with an additional embodiment of the present disclosure. The system includes a rotary table 510 having a part fixture 520 mountable thereto. In various embodiments, the part fixture 520 may be removably or permanently coupled to the rotary table 510. In other embodiments, the rotary table 510 may be provided with an integrated part fixture 520. The rotary table 510 is rotatable about a vertical axis Y" passing through a center point of the rotary table 510, and this rotation is imparted to the part fixture 520. In the present embodiment, an actuator 512 is operatively connected to the rotary table 510 to rotate the rotary table 510 as described herein. The actuator 512 may be any suitable device or system, such as but not limited to an electric motor (not shown), a pneumatic motor, and the like. The actuator 512 may be operatively connected to the rotary table 510 in any way suitable to each particular embodiment of the system 500 and the part(s) to be processed/outputted by the system 500. For example, the actuator 512 may be operatively connected to the rotary table 510 through one or more gears, belts or other such components (not shown). The part fixture 520 may be any suitable device or system so long as it is operable to retain a component or part 530 to be measured and imparting the rotation from the rotary table 510 to the retained part 530. The part fixture 520 may for example be a chuck, a clamp, etc. As discussed above, the part 530 to be measured may be a component of a gas turbine engine as in FIG. 1, or another type of component. As will be discussed in further detail below, one or more objects 580 having known dimensions (not shown), also referred to as artifacts, may be retained by the part fixture 520 for calibration purposes. A measuring instrument or device 540 is provided to take measurements of the part 530. As will be discussed in further detail below, in various embodiments the measuring device 540 may be calibrated by taking measurements of the artifact and by comparing these taken measurements to the artifact's known dimensions. In the shown embodiment, the artifact 580 is integrated with the part 530 on the part fixture 520 so that the measuring device 540 may be calibrated while the part 530 is being measured, i.e. in-process calibration.

In an embodiment, the rotary table 510 and the measuring device 540 are mountable to a machine table 550, for instance to allow a part 530 to be measured immediately after its production or modification. Such machine tables 550 may include a lathe, a milling machine, a computer numerical control (CNC) machine, an additive printing machine, etc. In other embodiments, the rotary table 510 and the measuring device 540 may be mounted to other tables or surfaces to measure the part 530.

Illustratively, the measuring device 540 includes a probe 542 for contacting surfaces on the part 530 to be measured and recording their relative position. The measuring device further includes a housing 544 and a base 546 for joining the measuring device 540 to the machine table 550 or other surface. In use, as shown in FIG. 5A, the measuring device 540 is movable along two axes, shown as horizontal axis X''' and vertical axis allowing the probe 542 to approach the part 530 to be measured and take various measurements. In embodiments, the housing 544 may include linear actuator(s), cylinder(s), electric motor(s) and various belts, gears and the like to allow the measuring device to move along axes X''' and Y'''. Other measurement devices 540 may be considered, such as optical devices employing infrared technology, laser technology or the like. In such cases, the measuring device 540 may be solely movable along the vertical axis Y''' as it may record its measurements without having to approach the part 530 along the X''' axis. In various embodiments, the rotary table 510 may rotate by a predetermined value, for example by 180 degrees, between each taken measurement by the measuring device 540. Such a process may be automated or semi-automated, as will be discussed in further detail below.

In embodiments, the system 500 may further include a processing device (not shown) for performing various tasks such as controlling the rotation of the rotary table 510, controlling the movements and measurement taking of the measuring device 540, storing the taken measurements by the measuring device 540, and calculating a calibration offset for the measuring device 540, as in the embodiments of FIGS. 2A-2C discussed above.

With reference to FIG. 6 in addition to FIGS. 5A-5B, there is shown a method 600 for measuring and outputting a part, for instance the part 530, in accordance with an additional embodiment of the present disclosure. The method 600 may be of the type performed by the system 500, for instance in an automated or semi-automated mode using the processing unit (not shown) operating the rotary table 510 via the actuator 512 and the measuring device 540. At step 602, the part 530 to be measured is held to the rotary table 510, illustratively via the part fixture 520. The artifact 580 having known dimensions is integrated with the part 530 to be measured on the rotary table 510. As shown in FIGS. 5A-5B, the artifact may include two portions placed on opposite sides of the part 530. In addition, the artifact 580 may be chosen to have a lesser height than the part 530 to render the method 500 more efficient, as will be discussed in further detail below.

At step 604, a plurality of measurements of the artifact 580 with known dimensions are taken with the measuring device 540, with the rotary table 510 rotating by a predetermined value between each taken measurement. The measuring device 540 may be positioned along it's X''' and Y''' axes to take such measurements. In the shown embodiment, two measurements of the artifact 580 are taken, at contact points 582, 584, with the rotary table 510 rotating 180 degrees between these taken measurements.

At step 606, a plurality of measurements of the part 530 to be measured are taken with the measuring device 540, with the rotary table 510 rotating by a predetermined value between each taken measurement. The measuring device 540 may be positioned along it's X''' and Y''' axes to take such measurements. In the shown embodiment, two measurements of the part 530 to be measured are taken, at contact points 532, 534, with the rotary table 510 rotating 180 degrees between these taken measurements.

In an embodiment, steps 604 and 606 may be performed simultaneously. If the artifact 580 is chosen to have a lesser height than the part 530, as mentioned above, the measurements of contact points 532 and 582 (or vice-versa) may be taken one after the other, i.e. sequentially, by adjusting the height of the measuring device 540 along the Y''' axis. Similarly, after rotating the rotary table 510 by a predetermined value, illustratively by 180 degrees, the measurements of contact points 534 and 584 (or vice-versa) may be taken one after the other, i.e. sequentially. In such an embodiment, the measuring device 540 and the rotary table 510 require fewer adjustments to take the necessary measurements of the part 530 and the artifact 580, requiring less overall time.

At step 608, the measuring device 540 is calibrated. The plurality of taken measurements of the artifact 580 are compared to the artifact's 580 known dimensions to obtain a calibration offset for the measuring device 540. Illustratively, the known dimensions may be an actual distance between the two portions of the artifact 580, and the taken measurements at contact points 582, 584 are used to calculate a measured distance between the two portions of the artifact 580. Any discrepancies between the actual distance and the measured distance will thus be accounted for by the calibration offset. The calibration of the measuring device 540 is said to be in-process as it occurs during the actual measuring process of the part 530 to be measured.

At step 610, the calibration offset derived in the previous step is used to correct the taken measurements of the part 530 to be measured. In the shown exemplary embodiment, the part 530 includes a circular shape whose diameter is to be measured. As such, the measurement of contact points 532, 534, after being corrected via the calibration offset, provide an accurate determination of this diameter. Other measurements may be performed using this method, for example to calculate the distance between two parallel surfaces. At step 612, the measured part 530 is outputted with calibrated measurements. In an embodiment, method 600 is performed as part of a larger part inspection system whereby the desired or expected measurements of part 530 are known. As such, the calculated and calibrated measurements of outputted part 530 may be compared to these expected measurements to verify if the part 530 meets certain criteria, for example if its measurements fall within an acceptable tolerance range.

Advantageously, the herein described systems and methods only require a single probing direction, as the rotary table orients the part being measured in between taken measurements. In addition, some embodiments of the present disclosure allow for in-process measurement, such as during a turning operation. In various embodiments, the parts being measured 230, 530 are components being inspected and thus have desired dimensions that the taken measurements must be compared to. As such, the accuracy and reliability of the herein described measurement methods 300, 600 may improve the overall inspection process of these parts.

As discussed above, the measuring systems 200, 500 may be integrated into the production or processing of the components or parts, for example to inspect the parts to ensure they satisfy various geometric or other requirements. Whether for gas turbine engines such as in FIG. 1 or in other contexts, components or parts are often mass produced in automated or semi-automated processes for rapidity and efficiency. As such, measuring systems 200, 500 may advantageously be included as a final or near-final step in a given process, for example to verify if the part's measurements are within an acceptable tolerance range. Thus, to ensure that the measurement process does not adversely affect the rapidity and efficiency of the overall process in which it is included in, it is essential that the above-described methods 300, 600 be carried out by an automated or semi-automated system such as measurement systems 200, 500. Further, the automation or semi-automation of systems 200, 500 promote the repeatability and accuracy of measurement methods 300, 600.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A system for outputting a part of an aircraft, comprising:
   a rotary table rotatable about a rotation axis and having a part fixture operable to removably secure an object having known dimensions to the rotary table, the part fixture operable to removably secure the part to the rotary table when the object is removed from the part fixture;
   an actuator operatively connected to the rotary table and operable to rotate the rotary table about the rotation axis;
   a processing unit operatively connected to the actuator and to a measuring device, the measuring device operable to execute measurements:
      of the object while the object is removably secured to the part fixture, and
      of the part while the part is removably secured to the part fixture; and
   a non-transitory computer-readable memory communicatively coupled to the processing unit and comprising computer-readable instructions executable by the processing unit, the instructions, when executed by the processing unit, causing:
      a) while the object is removably secured to the part fixture, calibrating the measuring device by:
         receiving, by the processing unit, a plurality of measurements of the object from the measuring device,
         rotating, by the processing unit, via the actuator the rotary table between each measurement of the plurality of measurements of the object, and
         determining, by the processing unit, a calibration offset of the measuring device by determining differences between the plurality of measurements and the known dimensions of the object;
      b) while the part is removably secured to the part fixture:
         receiving, by the processing unit, a plurality of measurements of the part from the measuring device, and
         rotating, by the processing unit, via the actuator the rotary table between each measurement of the plurality of measurements of the part;
      c) correcting, by the processing unit, the plurality of measurements of the part based on the calibration offset of the measuring device; and
      d) generating, by the processing unit, at least one signal indicative of outputting the measured part.

2. The system as defined in claim 1, wherein the instructions when executed by the processing unit cause the processing unit to execute the calibrating at least twice during the taking the plurality of measurements of the part.

3. The system as defined in claim 1, wherein the instructions when executed by the processing unit cause the processing unit to execute the calibrating to further include rotating the rotary table by 90 degrees between each taken measurement.

4. The system as defined in claim 1, wherein the instructions when executed by the processing unit cause the processing unit to execute the receiving, by the processing unit, the plurality of measurements of the object to further include rotating, by the processing unit, the rotary table via the actuator by 90 degrees between each measurement.

5. The system as defined in claim 1, wherein the computer-readable instructions are further executable by the processing unit for verifying the measurements of the part by:
   estimating a runout vector of the part,
   rotating via the actuator the rotary table so that the runout vector is perpendicular to a measuring direction of the measuring device, and
   receiving an additional verification measurement of the part from the measuring device.

6. The system as defined in claim 1, wherein the instructions when executed by the processing unit cause the processing unit to execute the receiving, by the processing unit, the plurality of measurements of the object to include receiving a diameter of the part from the measuring device.

7. The system as defined in claim 1, wherein the instructions when executed by the processing unit cause the processing unit to execute the receiving, by the processing unit, the plurality of measurements of the object to include receiving a distance between two parallel surfaces on the part from the measuring device.

8. The system as defined in claim 1, wherein the measuring device includes a probe.

9. The system as defined in claim 1, wherein the actuator is one of an electric motor or a pneumatic motor.

10. The system as defined in claim 1, wherein the measuring device and the rotary table are mountable to a machine table.

11. A part measuring kit for a rotary table on a machine bed, comprising:

a part fixture mountable on the rotary table for retaining a part to be measured and/or an object having known dimensions;

a measuring device mountable on the machine bed and movable relative to the rotary table for taking measurements of the part to be measured and/or the object having known dimensions, wherein the rotary table is rotatable between each taken measurement; and a calibration offset calculator for:

calculating a calibration offset for the measuring device by comparing taken measurements of the object having known dimensions with the known dimensions; and correcting taken measurements of the part to be measured via the calculated calibration offset.

12. The part measuring kit as defined in claim 11, wherein the rotary table is rotatable by 90 degrees between each taken measurement.

13. The part measuring kit as defined in claim 11, wherein the rotary table is rotatable by 180 degrees between each taken measurement.

14. The part measuring kit as defined in claim 11, wherein the measuring device sequentially takes a set of measurements of the part to be measured and the object having known dimensions, wherein the rotary table is rotatable between each set of sequentially taken measurements.

15. The part measuring kit as defined in claim 11, wherein the measuring device includes a measuring probe.

16. The part measuring kit as defined in claim 11, wherein the rotary table is rotatable by an actuator.

17. The part measuring kit as defined in claim 11, wherein the object having known dimensions has a lesser height than the part to be measured.

18. The part measuring kit as defined in claim 11, wherein the part to be measured in a part of an aircraft.

\* \* \* \* \*